United States Patent
Qin et al.

(10) Patent No.: US 8,937,421 B2
(45) Date of Patent: Jan. 20, 2015

(54) ELECTRIC MOTOR

(75) Inventors: Rui Feng Qin, Hong Kong (CN); Fei Liu, Shenzhen (CN); Ji Yu Liang, Shenzhen (CN)

(73) Assignee: Johnson Electric S.A., Murten (CH)

(*) Notice: Subject to any disclaimer, the term of this patent is extended or adjusted under 35 U.S.C. 154(b) by 248 days.

(21) Appl. No.: 13/543,285

(22) Filed: Jul. 6, 2012

(65) Prior Publication Data

US 2013/0009510 A1  Jan. 10, 2013

(30) Foreign Application Priority Data

Jul. 8, 2011 (CN) .......................... 2011 1 0193003

(51) Int. Cl.
 *H02K 3/16* (2006.01)
 *H02K 23/38* (2006.01)
 *H02K 23/30* (2006.01)

(52) U.S. Cl.
 CPC ............... *H02K 23/38* (2013.01); *H02K 23/30* (2013.01)
 USPC ........................................................ 310/204

(58) Field of Classification Search
 None
 See application file for complete search history.

(56) References Cited

U.S. PATENT DOCUMENTS

| | | | | | |
|---|---|---|---|---|---|
| 5,155,403 | A | * | 10/1992 | Dyke et al. | 310/208 |
| 6,703,751 | B2 | * | 3/2004 | Tanaka et al. | 310/198 |
| 6,891,304 | B1 | * | 5/2005 | Cros et al. | 310/198 |
| 7,560,848 | B2 | * | 7/2009 | Roos et al. | 310/234 |
| 7,567,007 | B2 | | 7/2009 | Furui | |
| 7,982,354 | B2 | * | 7/2011 | Qin et al. | 310/198 |
| 2009/0058210 | A1 | * | 3/2009 | Qin et al. | 310/179 |

FOREIGN PATENT DOCUMENTS

EP  1042858  10/2000

* cited by examiner

*Primary Examiner* — Tran Nguyen
(74) *Attorney, Agent, or Firm* — Muncy, Geissler, Olds & Lowe, P.C.

(57) ABSTRACT

An electric motor includes a stator, a rotor, and multiple brushes. The stator forms multiple poles. The number of brushes is less than the number of stator poles. The rotor includes a commutator, windings, and equalizing units. The commutator includes segments electrically connected with the windings. Each of the equalizing units is electrically connected with multiple equipotential segments to make the equipotential segments have the same potential. Multiple parallel circuits are formed between the equipotential segments by the equalizing unit. The brushes are arranged to slidably contact the segments of the commutator.

12 Claims, 10 Drawing Sheets

US 8,937,421 B2

ELECTRIC MOTOR

CROSS REFERENCE TO RELATED APPLICATIONS

This non-provisional patent application claims priority under 35 U.S.C. §119(a) from Patent Application No. 201110193003.8 filed in The People's Republic of China on Jul. 8, 2011.

FIELD OF THE INVENTION

This invention relates to an electric motor and in particular, to a brush motor with a low risk of fusing equalizing wires thereof.

BACKGROUND OF THE INVENTION

A brush motor includes a commutator mounted on a rotor, and at least one pair of brushes mounted on a stator. The commutator is electrically connected with windings of the rotor. The brushes are arranged to slidably contact segments of the commutator to provide power to the rotor. Usually, the number of pairs of brushes is equal to the number of pairs of stator poles.

Referring to FIG. 9, a typical six-pole, nine-slot brush motor is shown in developed view. The windings of the motor includes 18 coils 80 wound around nine teeth T1-T9 of a stator. The commutator of the motor includes 18 segments S1-S18 electrically with the coils 80. The motor further includes a plurality of equalizing wires e1 -e6, each of which electrically connects multiple equipotential segments S1-S18, such that the voltage of the multiple equipotential segments are the same. That is, the equalizing wires e1-e6 can replace one or more pairs of brushes. Thus, the number of pairs of brushes can be reduced by using the equalizing wires. The brushes are not shown in FIG. 9.

Referring to FIG. 10, the motor is only equipped with one pair of brushes 71 and 72. When the brushes 71, 72 respectively contact the segments S1 and S10, the segments S7 and S13 each have a potential equal to that of the segment S1 as the segments S1, S7 and S13 are electrically connected together by the equalizing wire e1. The segments S4 and S16 each have a potential equal to that of the segment S10 as the segments S4, S10 and S16 are electrically connected together by the equalizing wire e4. Therefore, six parallel circuits are formed in the windings, and each parallel circuit includes three coils 80 electrically connected in series. Arrows in FIG. 10 show direction of the current flowing in the coils 80. Suppose the strength of the current in each parallel circuit is I, the strength of the current flowing in the equalizing wire e1 connected between the segments S1 and S7 is thus 4I, the current flowing in the equalizing wire e1 is too large, which may result in a high risk of fusing the equalizing wire e1.

FIG. 11 shows the motor equipped with two further brushes 73, 74. Also suppose the strength of the current in each parallel circuit is I, the strength of the current flowing in the equalizing wire el connected between the segments S7 and S13 is thus 2I, the current flowing in the equalizing wire is also too large although another pair of brushes 73, 74 has been added.

Therefore, there is a need in the art to provide an improved brush motor which has a low risk of fusing the equalizing wires.

SUMMARY OF THE INVENTION

Accordingly, in one aspect thereof, the present invention provides a rotor for a brush motor, the rotor comprising: a commutator comprising a plurality of segments, the segments forming a plurality of equally spaced equipotential segments; windings electrically connected to the segments of the commutator; and a plurality of equalizing units, each of the equalizing units electrically connecting together a respective plurality of equipotential segments, wherein the equalizing units form a plurality of parallel electric circuits between the segments of the respective plurality of equipotential segments.

Preferably, each equalizing unit is in the form of an equalizing wire, and the equalizing wire forms a closed loop which electrically connects together the segments of the respective plurality of equipotential segments.

Preferably, each equalizing unit comprising a plurality of equalizing wires, all of which start from the same segment, and are connected with the same intermediate segment, and are terminated at the same segment.

Preferably, each equalizing unit consists of two equalizing wires.

Preferably, the equalizing wires of each equalizing unit are twisted together.

According to a second aspect thereof, the present invention also provides an electric motor comprising: a stator forming a plurality of poles; a rotor comprising: a commutator comprising a plurality of segments, the segments forming a plurality of equally spaced equipotential segments; windings electrically connected to the segments of the commutator; and a plurality of equalizing units, each of the equalizing units electrically connecting together a respective plurality of equipotential segments; and a plurality of brushes arranged to slidably contact the segments of the commutator, the number of brushes being less than the number of stator poles, wherein the equalizing units form a plurality of parallel electric circuits between the segments of the respective plurality of equipotential segments.

Preferably, each equalizing unit is in the form of an equalizing wire, and the equalizing wire forms a closed loop which electrically connects together the segments of the respective plurality of equipotential segments.

Preferably, each equalizing unit comprising a plurality of equalizing wires, all of which start from the same segment, and are connected with the same intermediate segment, and are terminated at the same segment.

Preferably, each equalizing unit consists of two equalizing wires.

Preferably, the equalizing wires of each equalizing unit are twisted together.

Preferably, the number of stator poles is six, and the number of brushes is two or four.

BRIEF DESCRIPTION OF THE DRAWINGS

Preferred embodiments of the invention will now be described, by way of examples only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
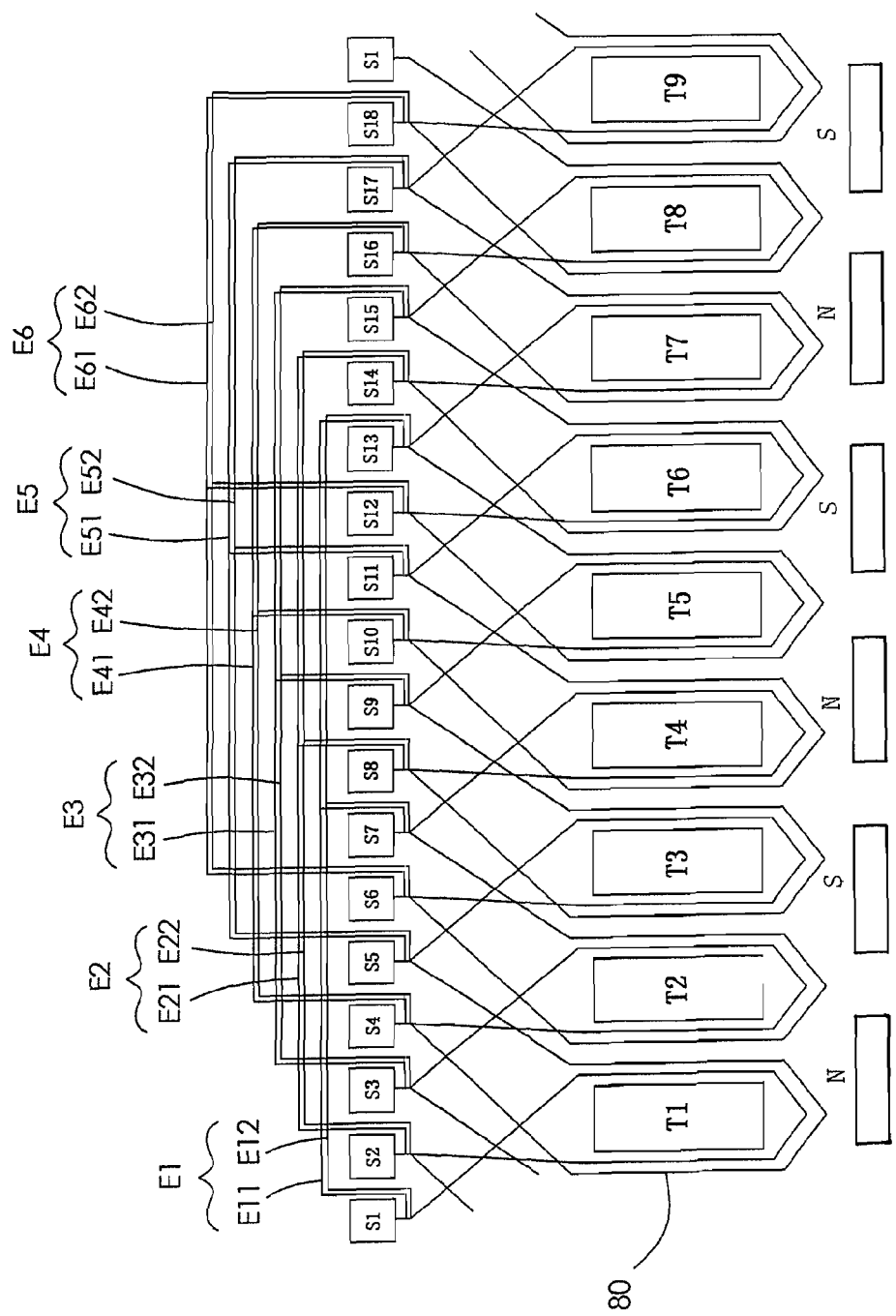
FIG. 1 is a schematic drawing showing windings of a motor according to a first embodiment, showing teeth and segments in developed view.

Referring to FIG. 1, a brush motor according to a first embodiment of the present invention includes a stator and a rotor. In this embodiment, the motor is a six-pole, nine-slot, eighteen-bar motor, for illustration purposes only. Six-pole, nine-slot, eighteen-bar motor, means that the motor has six stator poles, nine rotor poles and eighteen commutator segments.

The stator includes six magnet poles, i.e., three N poles and three S poles. The N poles and S poles are alternately arranged along a circumferential direction of the stator. The rotor includes a rotor core with nine teeth T1-T9, a commutator having 18 segments S1-S18, concentrated rotor windings wound around the teeth T1-T9 and terminated at the segments S1-S18. The windings includes 18 coils 80 each of which, in this embodiment, is wound around one tooth.

The rotor further includes six equalizing units E1-E6, each of which, in this embodiment, includes two equalizing wires. Each equalizing unit E1-E6 electrically connects three equipotential segments in sequence along a circumferential direction of the commutator. The three equipotential segments are angularly spaced from each other by 60° in this embodiment. Specifically, the equalizing wires of one equalizing unit start at the same segment, and are electrically connected to the same intermediate segment, and terminate at the same segment.

Figure 2:
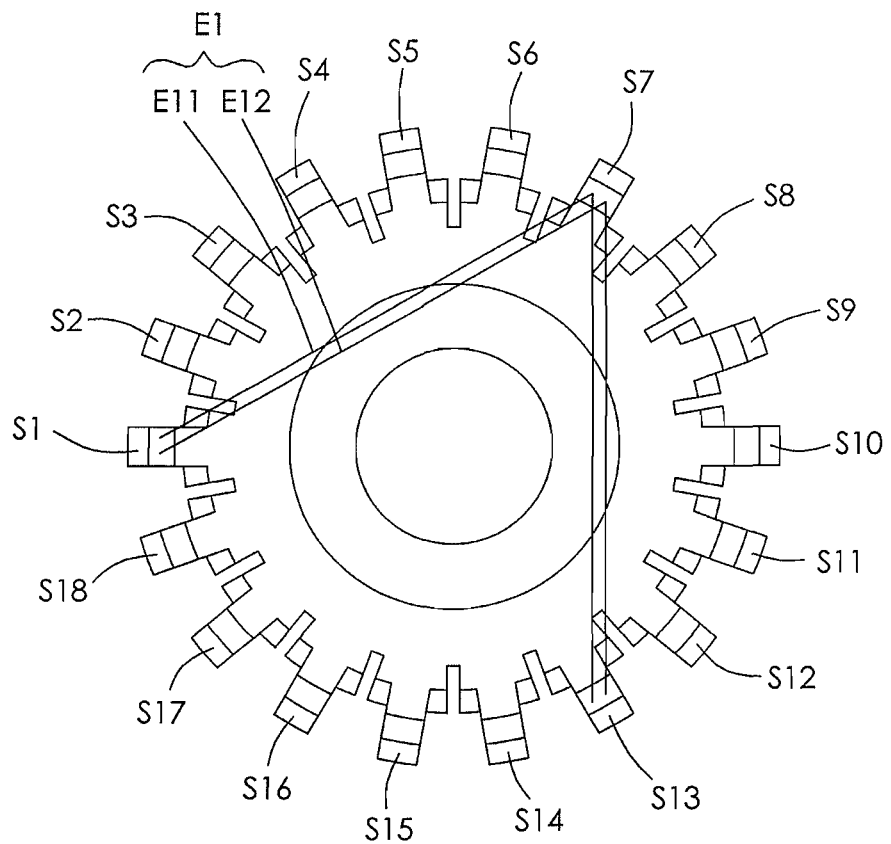
FIG. 2 shows a commutator of the motor of FIG. 1, illustrating an equalizer unit wound on the commutator.

Referring to FIG. 2, only the first equalizing unit E1 is shown in FIG. 2 for clarity. The first equalizing unit E1 includes two equalizing wires E11 and E12. Equalizing wires E11 and E12 both start from the segment S1, then are electrically connected to the segment S7, and are finally terminated at the segment S13. Thus, two identical parallel branches are formed between the segments S1, S7 and S13. In other words, one equalizing wire E11 electrically connects the segments S1, S7 and S13 in turn along the circumferential direction, whereby one branch is formed between the segments S1, S7 and S13. The other equalizing wire E12 electrically connects the segments S1, S7 and S13 in turn along the same circumferential direction, whereby the other identical branch is formed between the segments S1, S7 and S13. Therefore, two identical branches are formed between the segments S1, S7 and S13. The other equalizing units E2-E6 respectively electrically connect corresponding segments to form two identical parallel branches there among by using the same method as the first equalizing unit.

Preferably, the equalizing units E1-E6 are connected to the segments before winding the rotor coils 80. Alternatively, the equalizing units E1-E6 can also be connected to the segments during or after winding of the rotor.

Before the equalizing units E1-E6 are connected to the segments S1-S18, the equalizing wires of one equalizing unit are preferred to be twisted together, and are preferred to be welded to the segments together, such that the equalizing wires in one equalizing unit are integrated to simplify the connection process between the equalizing unit to the segments.

Figure 3:
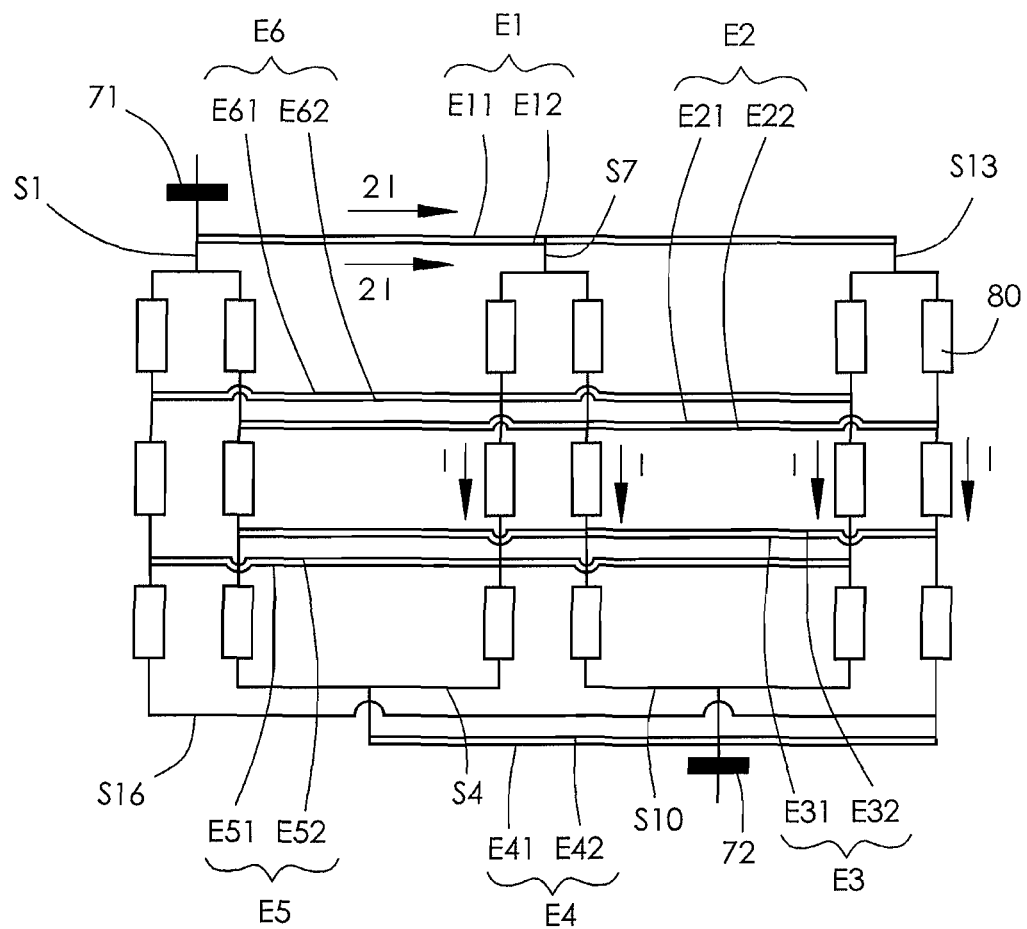
FIG. 3 is an equivalent circuit diagram for the motor of FIG. 1, illustrating the electrical relationship of the rotor and the brushes, wherein the motor is equipped with two brushes.

Referring to FIG. 3, the motor is equipped with two brushes 71 and 72, which are mounted on an end cap (not shown). The brushes 71, 72 are arranged to slidably contact the segments S1-S18 of the commutator to provide power to the rotor. When the brushes 71, 72 respectively contact the segments S1 and S10, the segments S1 and S10 thus get the potentials respectively equaling to the positive pole and the negative pole of the power supply. As the segments S1, S7 and S13 are connected together by the equalizing wires E11 and E12, the segments S7 and S13 each have a potential equal to that of the segment S1 and power is supplied to the segments S7 and S13 via the equalizing wires E11 and E12. Similarly, since the segments S4, S10 and S16 are electrically connected together by equalizing wires E41 and E42, the segments S4 and S16 each have a potential equal to that of the segment S10. Therefore, six parallel circuits are formed in the windings, and each parallel circuit includes three coils 80 electrically connected in series. That is to say, the equalizing units E1-E6 function as four further brushes.

Figure 9:
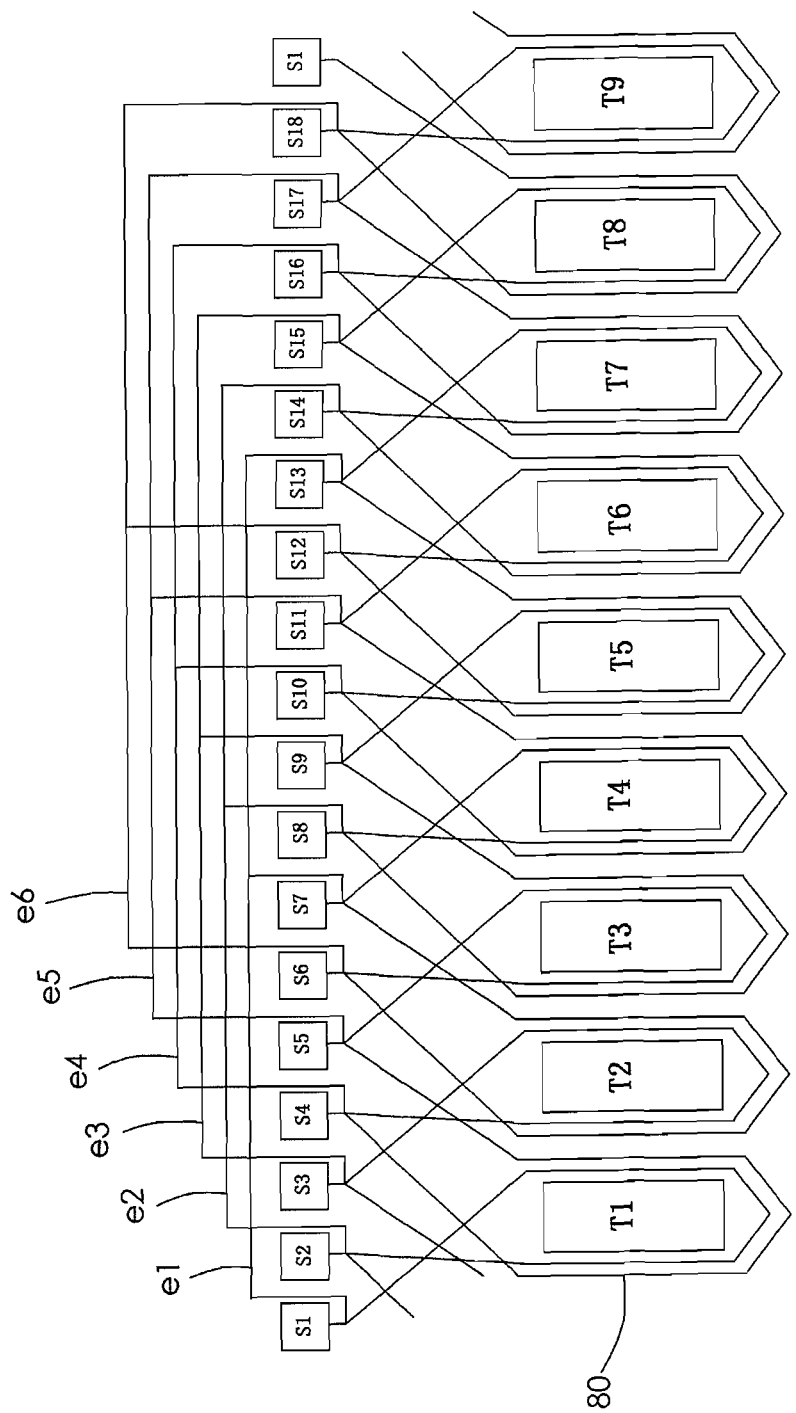
FIG. 9 is a schematic drawing showing windings of a typical motor, showing teeth and segments in developed view.
Figure 10:
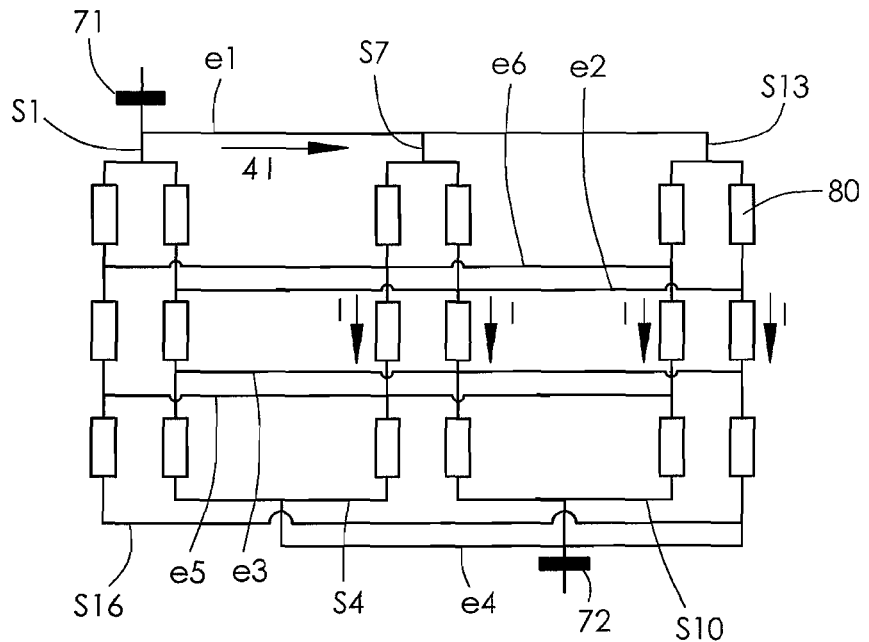
FIG. 10 is an equivalent circuit diagram for the motor of FIG. 9, illustrating the electrical relationship of the rotor and the brushes, wherein the motor is equipped with two brushes.
Figure 11:
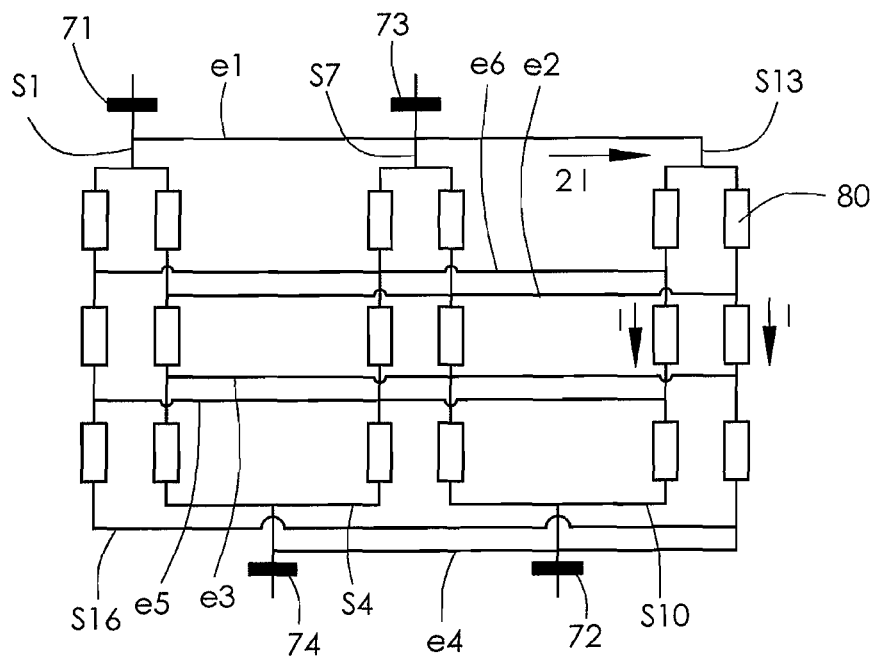
FIG. 11 is an equivalent circuit diagram for the motor of FIG. 9, also illustrating the electrical relationship of the rotor and the brushes, wherein the motor is equipped with four brushes.

Arrows in FIG. 3 show the direction of the current flowing in the windings. Supposing that the current in each parallel circuit is I, the total current flowing between the segments S1 and S7 is 4I, and thus the current flowing in each of the equalizing wires E11 and E12 is 2I, as the equalizing wires E11 and E12 forms two shunt paths between segments S1 and S7. That is, the strength of the current flowing in each of the equalizers E11 and E12 is half of that flowing in the equalizing wire e1 connected between the segment S1 and S7 of the typical motor of FIG. 9. Therefore, heat produced in each equalizing wire E11 or E12 is significantly reduced relative to that produced in the equalizing wire e1 of the typical motor, thus reducing a risk of fusing the equalizing wires E11 and E12.

It should be understood that the number of the equalizing wires in one equalizing unit can be more than two. In that case, the equalizing unit forms more than two shunt paths and thus the strength of the current in each equalizing wire is further reduced. Therefore, the risk of fusing the equalizing wires can be further reduced.

Figure 4:
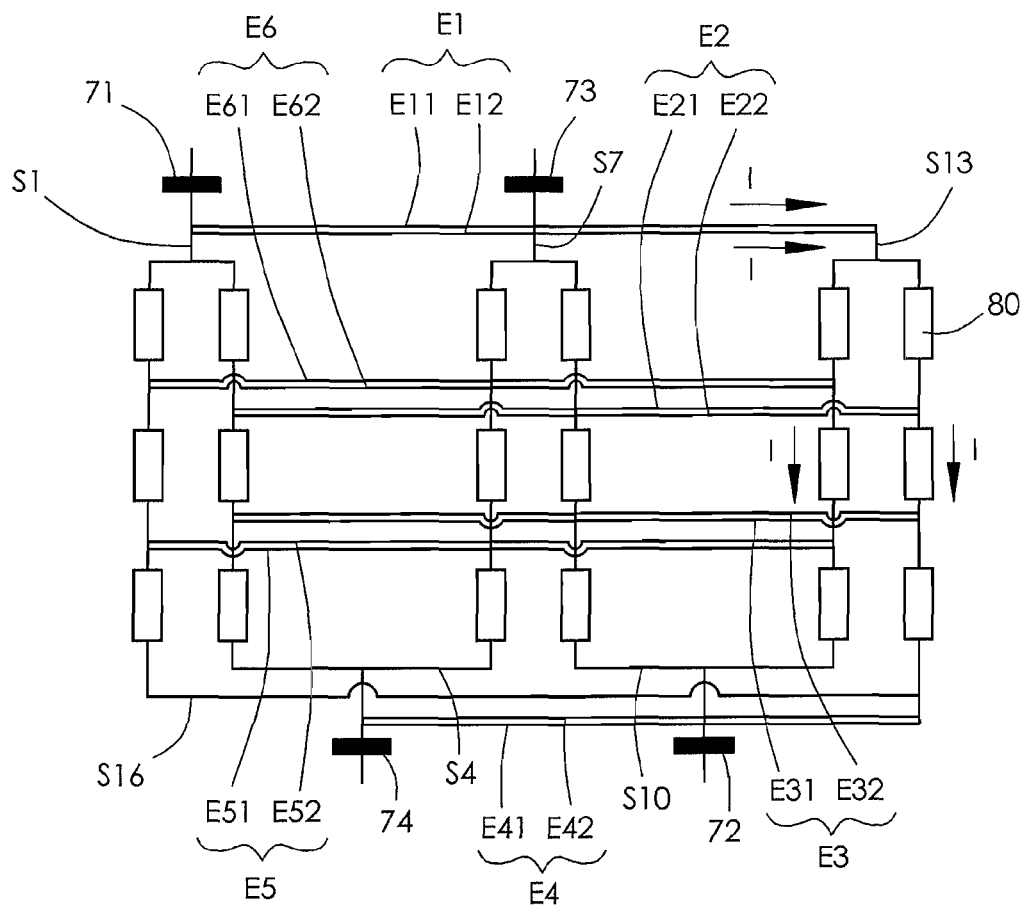
FIG. 4 is an equivalent circuit diagram for the motor of FIG. 1, also illustrating the electrical relationship of the rotor and the brushes, wherein the motor is equipped with four brushes.

The motor of FIG. 4, is equipped with two further brushes 73 and 74. That is, the motor has four brushes 71-74 in total. Again, supposing that the current in each parallel circuit is I, the total current between the segments S7 and S13 is thus 2I, and thus the current flowing in each of the equalizers E11 and E12 is I as the equalizers E11 and E12 form two shunt paths between segments S7 and S13. That is, the strength of the current flowing in each of the equalizers E11 and E12 is half of that flowing in the equalizing wire el connected between the segments S7 and S13 of the typical motor. Therefore, heat produced in each equalizing wire E11 or E12 is significantly reduced relative to that produced in the equalizing wire el of the typical motor, also reducing a risk of fusing the equalizing wires E11 and E12.

Figure 5:
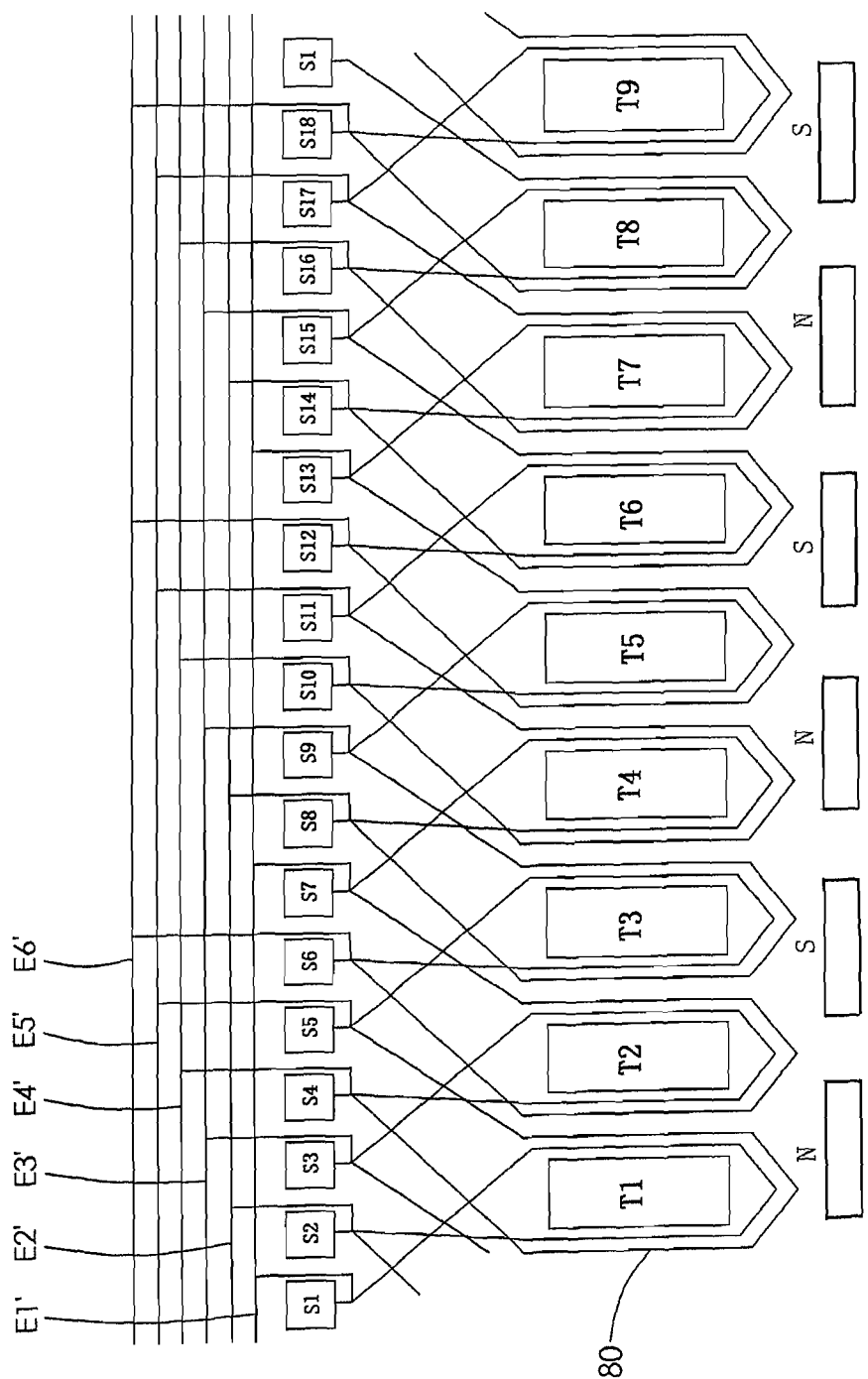
FIG. 5 is a schematic drawing showing windings of a motor according to a second embodiment, showing teeth and segments in developed view.

Referring to FIG. 5, a motor according to a second embodiment of the present invention differs from the first embodiment in that, each equalizing unit E1'-E6' is an equalizing wire E1'-E6', which electrically connects three equipotential segments, in sequence along a circumferential direction, to form a closed loop, and thus the three segments are equalized.

Figure 6:
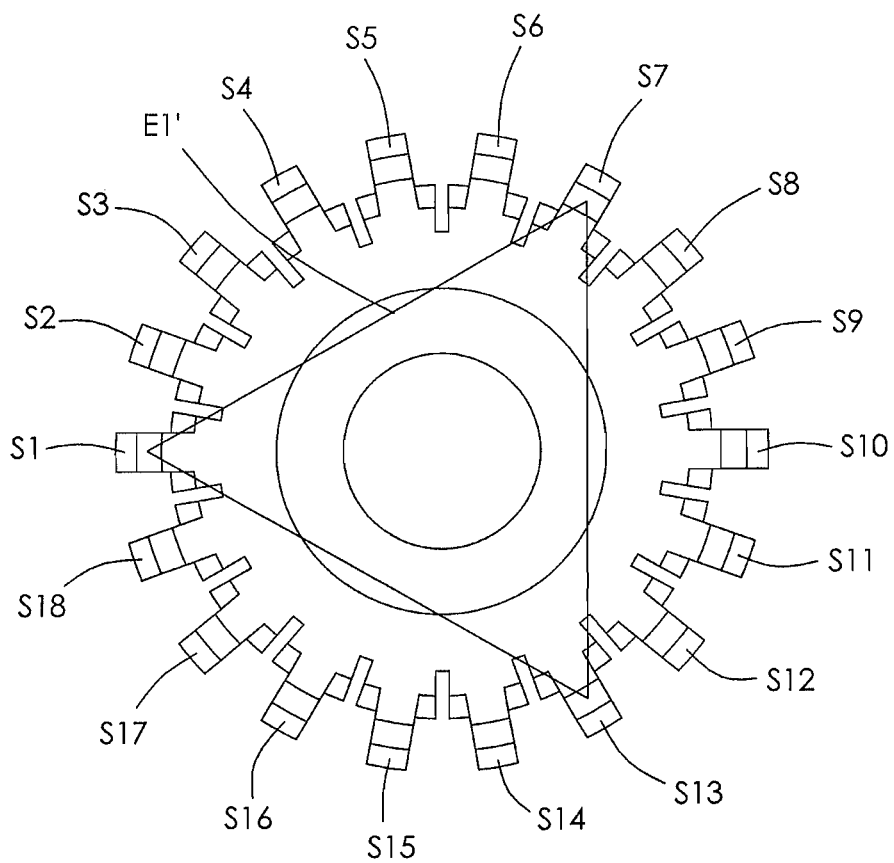
FIG. 6 shows a commutator of the motor of FIG. 5, illustrating an equalizer unit wound on the commutator.

FIG. 6 shows only one equalizing unit/equalizing wire E1' for illustrating the connection between the equalizing wires E1'-E6' and the segments S1-S18. The equalizing wire E1' starts from the segment S1, extending along a clockwise direction in FIG. 6, electrically connects to segment S7, then to segment S13, and then terminates on the segment S1, such that a closed loop is formed among the segments S1, S7 and S13. It can also be considered as that, the equalizing wire E1' starts from the segment S1, extends along an anticlockwise direction in FIG. 6, electrically connecting to the segment S13, then to the segment S7, and finally terminates on the segment S1, such that a closed loop is formed among the segments S1, S7 and S13.

Figure 7:
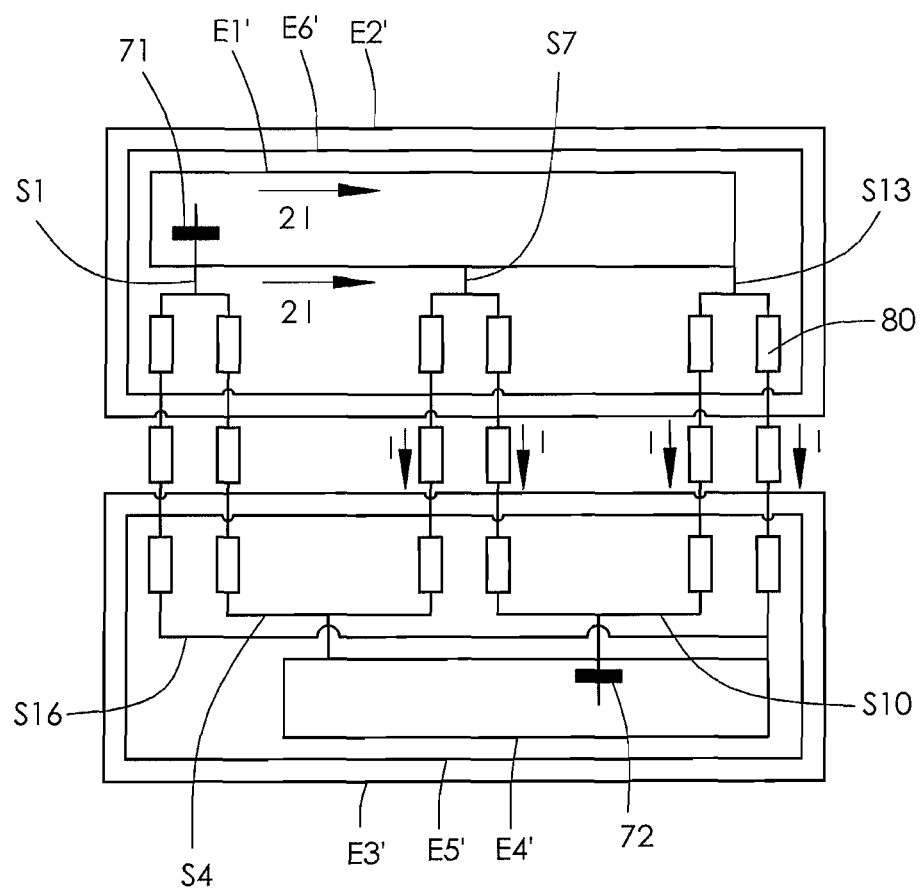
FIG. 7 is an equivalent circuit diagram for the motor of FIG. 5, illustrating the electrical relationship of the rotor and the brushes, wherein the motor is equipped with two brushes.

FIG. 7 shows an equivalent circuit diagram of the motor shown in FIG. 5, wherein the motor is equipped with two brushes 71 and 72. In this state, the brushes 71 and 72 respectively contact the segments S1 and S10. Supposing that the strength of the current in each parallel circuit is I, then the current flowing from the segment S1 to S7, and the current flowing from the segment S1 to S13, are both 2I, as two portions of the equalizing wire E1' respectively connect the segment S1 to S7 and S13. The maximum current flowing in the equalizing wire E1' is half of that of the equalizing wire el of the typical motor of FIG. 9. Therefore, heat produced in the equalizing wire E1' is significantly reduced relative to that produced in the equalizing wire el of the typical motor, thus reducing a risk of fusing the equalizing wire E1'.

Figure 8:
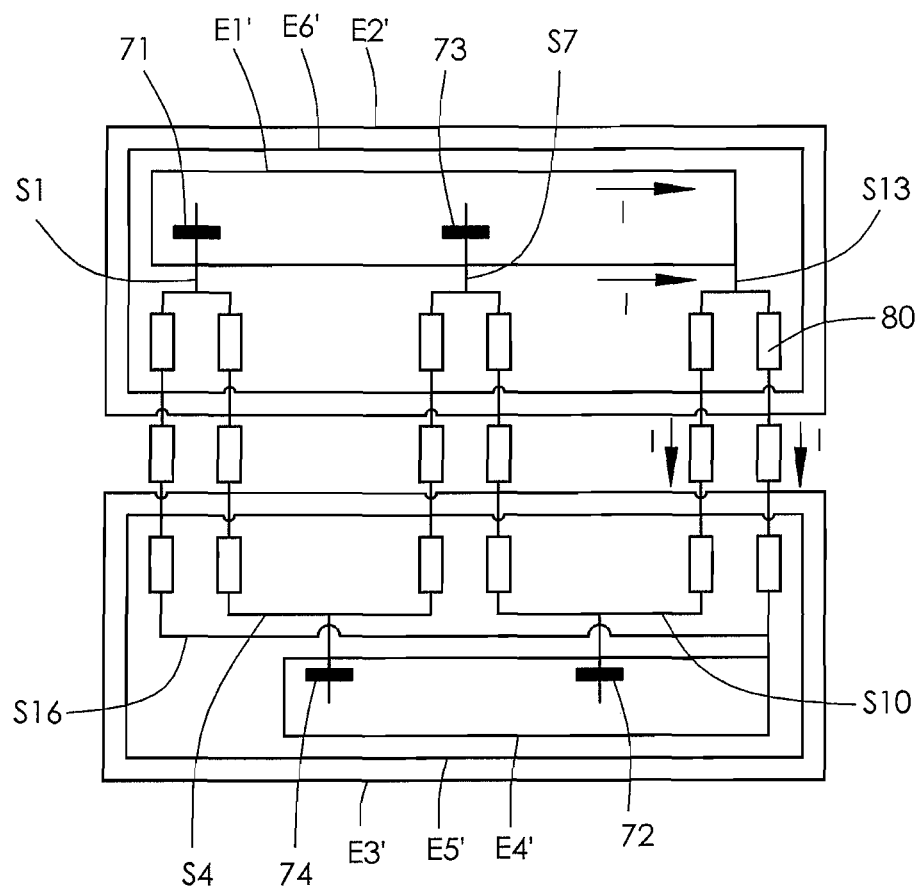
FIG. 8 is an equivalent circuit diagram for the motor of FIG. 5, also illustrating the electrical relationship of the rotor and the brushes, wherein the motor is equipped with four brushes.

Referring to FIG. 8, the motor is equipped with two further brushes 73 and 74. That is, the motor has four brushes 71-74 in total. Again, supposing the current flowing in each parallel circuit is I, then the maximum current in the equalizing wire E1' is I, which is half of that of equalizing wire el of the typical motor. Therefore, heat produced in the equalizing wire E1' is significantly reduced relative to that produced in the equalizing wire el of the typical motor, thus reducing a risk of fusing the equalizing wire E1'.

Compared with the motor according to the first embodiment, the motor according to the second embodiment only has six equalizing wires E11'-E6', reducing a total material of the equalizing wires. Specifically, the reduced material of the equalizing wires may be substantially ¼ of that of the equalizing wires of the motor according to the first embodiment.

It should be noted that although the motor is a six pole motor in the embodiments shown, in practice the motor can be a motor with 2(n+1) poles, wherein n is a natural number, as long as the number of brushes is less than that of the poles, and thus there is a need for equalizing wires.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A rotor for a brush motor, the rotor comprising:
   a commutator comprising a plurality of segments, the segments forming a plurality of equally spaced equipotential segments;
   windings electrically connected to the segments of the commutator, the windings comprising a plurality of coils cooperatively form a plurality of parallel branches connected between the segments of the commutator; and
   a plurality of equalizing units, each of the equalizing units electrically connecting together a respective plurality of equipotential segments,
   wherein each of the equalizing units forms a plurality of parallel electric circuits between the segments of the respective plurality of equipotential segments, the plurality of parallel electric circuits short circuiting the segments of the respective plurality of equipotential segments.

2. The rotor of claim 1, wherein each equalizing unit is in the form of at least one equalizing wire, and the at least one equalizing wire forms a closed loop which electrically connects together the segments of the respective plurality of equipotential segments in sequence along a circumferential direction of the commutator.

3. The rotor of claim 1, wherein each equalizing unit comprising a plurality of equalizing wires, all of which start from a same segment, and are connected with a same intermediate segment, and are terminated at a same segment.

4. The rotor of claim 3, wherein each equalizing unit consists of two equalizing wires.

5. The rotor of claim 3, wherein the equalizing wires of each equalizing unit are twisted together.

6. An electric motor comprising:
   a stator forming 2p poles, wherein p is an inner greater than 1;
   a rotor comprising:
      a commutator comprising a plurality of segments, the segments forming a plurality of equally spaced equipotential segments;
      windings electrically connected to the segments of the commutator, the windings comprising a plurality of coils cooperatively form a plurality of parallel branches connected between the segment of the commutator; and
      a plurality of equalizing units, each of the equalizing units electrically connecting together a respective plurality of equipotential segments; and
   2n brushes arranged to slidably contact the segments of the commutator, wherein n is a positive integer less than p,
   wherein each of the equalizing units forms z parallel electric circuits between the segments of the respective plurality of equipotential segments, wherein z is an integer greater than 2, the electric circuits short circuiting the segments of the respective plurality of equipotential segments.

7. The motor of claim 6, wherein each equalizing unit is in the form of at least one equalizing wire, and the at least one equalizing wire forms a closed loop which electrically connects together the segments of the respective plurality of equipotential segments in sequence along a circumferential direction of the commutator.

8. The motor of claim 6, wherein each equalizing unit comprising a plurality of equalizing wires, all of which start from a same segment, and are connected with a same intermediate segment, and are terminated at a same segment.

9. The motor of claim 8, wherein each equalizing unit consists of two equalizing wires.

10. The motor of claim 8, wherein the equalizing wires of each equalizing unit are twisted together.

11. The motor of claim 6, wherein the number of stator poles is six, and the number of brushes is two or four.

12. The motor of claim 6, wherein a current density in each of said electric circuits has a maximum value equal to or less than $2*(p-n)*I/z$, wherein, I is a current density through each parallel branch.

* * * * *